(12) United States Patent
Song

(10) Patent No.: US 11,513,960 B2
(45) Date of Patent: Nov. 29, 2022

(54) DATA STORAGE DEVICE AND OPERATING METHOD THEREOF

(71) Applicant: SK hynix Inc., Gyeonggi-do (KR)

(72) Inventor: Da Eun Song, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/148,202

(22) Filed: Jan. 13, 2021

(65) Prior Publication Data

US 2021/0382824 A1    Dec. 9, 2021

(30) Foreign Application Priority Data

Jun. 9, 2020    (KR) .......................... 10-2020-0069797

(51) Int. Cl.
```
G06F 12/0862    (2016.01)
G06F 12/02      (2006.01)
G06F 12/0891    (2016.01)
G06F 13/16      (2006.01)
G06F 12/0844    (2016.01)
G06F 12/128     (2016.01)
G06F 12/0897    (2016.01)
G06F 3/06       (2006.01)
G06F 12/0811    (2016.01)
```

(52) U.S. Cl.
CPC ...... *G06F 12/0862* (2013.01); *G06F 12/0238* (2013.01); *G06F 12/0891* (2013.01); *G06F 13/1668* (2013.01)

(58) Field of Classification Search
CPC ............. G06F 12/0862; G06F 12/0238; G06F 12/0891; G06F 13/1668; G06F 8/4442; G06F 16/172

USPC ......................................................... 711/154
See application file for complete search history.

(56) References Cited

U.S. PATENT DOCUMENTS

| | | | | |
|---|---|---|---|---|
| 2009/0106496 | A1* | 4/2009 | Knebel | G06F 12/0897 711/136 |
| 2012/0084511 | A1* | 4/2012 | Dooley | G06F 9/383 711/122 |
| 2020/0327061 | A1* | 10/2020 | Tan | G06F 12/0862 |

FOREIGN PATENT DOCUMENTS

KR         10-1891265         8/2018

OTHER PUBLICATIONS

John Paul Shen, Modern Processor Design, 2005, Waveland Press, p. 140 (Year: 2005).*

* cited by examiner

*Primary Examiner* — Christopher D Birkhimer
*Assistant Examiner* — Sidney Li
(74) *Attorney, Agent, or Firm* — IP & T Group LLP

(57) ABSTRACT

A data storage device includes a first memory device; a second memory device including a fetch region configured to store data evicted from the first memory device and a prefetch region divided into a plurality of sections; storage; and a controller configured to control the first memory device, the second memory device, and the storage. The controller may include a memory manager configured to select prefetch data having a set section size from the storage, load the selected prefetch data into the prefetch region and update the prefetch data based on a data read hit ratio of each of the plurality of sections.

15 Claims, 9 Drawing Sheets

DATA STORAGE DEVICE AND OPERATING METHOD THEREOF

CROSS-REFERENCE TO RELATED APPLICATION

The present application claims priority under 35 U.S.C. § 119(a) to Korean Patent Application Number 10-2020-0069797, filed on Jun. 9, 2020, in the Korean Intellectual Property Office, which is incorporated herein by reference in its entirety.

BACKGROUND

1. Technical Field

Various embodiments generally relate to a semiconductor integrated device, and more particularly, to a data storage device and an operating method thereof.

2. Related Art

Computing devices may store data in a memory or process a command using data stored in the memory, in response to a request of a host.

Cache memories may be used to reduce the time it takes for a processing device to access information stored in a memory. The cache memories may be high-speed memories which store copies of instructions or data relatively frequently used or expected to be frequently used.

Multi-level caches may be configured to provide hierarchical access speed to further mitigate time delay which may result from a speed difference between a processor and a memory.

As a host and a processing device become faster and storage capacity of a memory is increased, there is a need for an operation policy of a memory device configured to store data between the processing device and the memory.

SUMMARY

In an embodiment of the present disclosure, a data storage device may include: a first memory device; a second memory device including a fetch region configured to store data evicted from the first memory device and a prefetch region divided into a plurality of sections; storage; and a controller configured to control the first memory device, the second memory device, and the storage. The controller may include a memory manager configured to select prefetch data having a set section size from the storage, load the selected prefetch data into the prefetch region and update the prefetch data based on a data read hit ratio of each of the plurality of sections.

In an embodiment of the present disclosure, an operating method of a data storage device which includes a first memory device, a second memory device which includes a fetch region configured to store data evicted from the first memory device and a prefetch region divided into a plurality of sections, storage, and a controller, the method comprising: selecting, by the controller, prefetch data having a size corresponding to a section size from the storage and loading the selected prefetch data into the prefetch region; and updating, by the controller, the prefetch data based on a data read hit ratio of each of the plurality of sections.

In an embodiment of the present disclosure, a data storage device may include: a storage; and a controller including first and second memories and configured to control the first memory, the second memory, and the storage, the second memory including a first region, a second region and a third region including a plurality of sections. The controller is configured to: store data evicted from the first memory in the first region; store data evicted from the first region in the second region; and select prefetch data having a set section size from the storage, and load the prefetch data into a particular section of the third region, the particular section determined based on a data read hit ratio.

These and other features, aspects, and embodiments are described in more detail below.

BRIEF DESCRIPTION OF THE DRAWINGS

The above and other aspects, features and advantages of the subject matter of the present disclosure will be more clearly understood from the following detailed description taken in conjunction with the accompanying drawings, in which.

DETAILED DESCRIPTION

Figure 1:
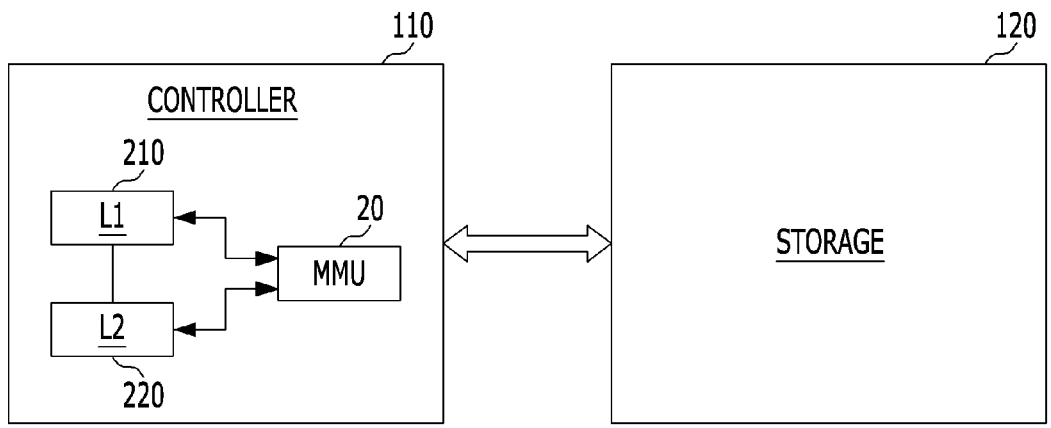
FIG. 1 is a diagram illustrating a configuration of a data storage device according to embodiments of the present disclosure.

Various embodiments of the present teachings are described in detail with reference to the accompanying drawings. The drawings are block and schematic illustrations of various embodiments (and intermediate structures). The invention, however, may be configured or arranged differently than shown in the drawings. Thus, the invention is not limited to any particular configuration. Rather, the invention encompasses all variations which do not depart from the spirit and scope of the present teachings as defined in the appended claims.

Although a few embodiments of the present teachings are shown and described, such embodiments are not exhaustive. It will be appreciated by those of ordinary skill in the art that changes may be made in these embodiments without departing from the principles and spirit of the present teachings.

Also, throughout the specification, reference to "an embodiment," "another embodiment" or the like is not necessarily to the same embodiment, and different references to any such phrase are not necessarily to the same embodiment(s). The term "embodiments" when used herein does not necessarily refer to all embodiments.

FIG. 1 is a diagram illustrating a configuration of a data storage device 10 according to an embodiment.

Referring to FIG. 1, the data storage device 10 may include a controller 110 and storage 120.

The controller 110 may control the storage 120 in response to a request of a host (not shown). In an embodiment, the controller 110 may control data to be programmed in the storage 120 in response to a write request of the host. The controller 110 may provide data written in the storage 120 to the host in response to a read request of the host. In an embodiment, the controller 110 may perform an operation using data provided from the host or data stored in the storage 120 according to a request of the host and may provide data derived as an operation result to a host or store the data derived as the operation result in the storage 120.

In an embodiment, the controller 110 may include, or be implemented with, a processor or control logic configured to process accesses of data and instructions.

The controller 110 may include a first memory device 210, a second memory device 220, and a memory manager (MMU) 20.

In an embodiment, the first memory device 210 may be a first level cache memory L1 which is located logically and physically closest to a processor of the controller 110 and operates at a first speed. In an embodiment, the first memory device 210 may include a volatile memory device or a nonvolatile memory device.

The second memory device 220 may be a second level cache memory L2 which operates at a second speed slower than the first speed. In an embodiment, the second memory device 220 may include a volatile memory device or a nonvolatile memory device. The second memory device 220 may be located logically and physically farther away from the processor of the controller 110 than the first memory device 210. In an embodiment, the second memory device 220 may be located between the first memory device 210 and the storage 120.

The storage 120 may be a disc device which operates at a third speed slower than the first speed. The third speed may be faster or slower than the second speed.

The storage 120 may store data or output stored data, according to control of the controller 110. The storage 120 may be configured as a volatile memory device and/or a nonvolatile memory device. In an embodiment, the nonvolatile memory device may be any of various nonvolatile memory devices such as an electrically erasable and programmable read only memory (EEPROM), a NAND flash memory, a NOR flash memory, a phase-change random access memory (PRAM), a Resistive RAM (ReRAM), a ferroelectric RAM (FRAM), and/or a spin torque transfer magnetic RAM (STT-MRAM). In an embodiment, the volatile memory device may be any of various volatile memory devices such as a dynamic random access memory (DRAM) and/or a static random access memory (SRAM).

The storage 120 may include a plurality of dies, a plurality of chips, or a plurality of packages. Further, the storage 120 may operate as a single-level cell (SLC) component in which one-bit data is to be stored in each memory cell or an extra-level cell (XLC) component in which multi-bit data is to be stored in each memory cell.

As described above, as the first memory device 210, the second memory device 220, and the storage 120 are configured to have a hierarchical structure, the controller 110 may manage data to be stored in the storage 120 through the memory manager 20.

In an embodiment, the memory manager 20 may be configured to load selected data from the storage 120 into the second memory device 220 according to a set criterion in advance of storage access. For example, the memory manager 20 may be configured to prefetch the selected data from the storage 120 before accessing the storage 120. To accommodate the prefetched data, at least a portion of the second memory device 220, i.e., a region thereof, may be allocated as a prefetch region. At least a portion of the remainder of the second memory device 220, i.e., a different region thereof, may be allocated as a fetch region.

The memory manager 20 may manage read hit ratios of the data prefetched in the second memory device 220 and retain data in, or evict data from, the second memory device 220 according to the data read hit ratios. In an embodiment, the hit ratio for each section, i.e., portion, of the second memory device 220, may be the number of read accesses to the corresponding section with respect to the number of read accesses to all sections, but the invention is not limited thereto.

In an embodiment, data having a relatively low hit ratio may be evicted from the second memory device 220, and data which are not cached in the first memory device 210 and the second memory device 220 may be selected from the storage 120 and moved to an empty space of the second memory device 220 formed as a result of the data eviction.

In an embodiment, the memory manager 20 may randomly select the data to be prefetched in the prefetch region.

In another embodiment, the memory manager 20 may monitor a memory request associated with an application being executed in the processor and select the data to be prefetched by determining or predicting data expected to be accessed by the processor. The data expected to be accessed by the processor may be data having temporal or spatial locality with respect to previously accessed data, but the invention is not limited thereto.

Accordingly, the operation speed of the data storage device 10 may be improved by reducing frequency of access to the storage 120 for accessing data to process a request of a host through the controller 110.

In an embodiment, the memory manager 20 may store first eviction data evicted from the first memory device 210 in the second memory device 220 which may temporarily accommodate retention of second eviction data selected as an eviction target from the second memory device 220. To that end, at least one portion of the second memory device 220 may be allocated as the fetch region. The fetch region may include a first fetch region in which the first eviction data evicted from the first memory device 210 is to be stored and a second fetch region in which the second eviction data evicted from the first fetch region is to be stored.

As data is cached in the first memory device 210 or the second memory device 220, the caching position of the data may be managed using an index table in an application executed in the controller 110, specifically, the processor. In an embodiment, unique identifiers (IDs) may be allocated to the first memory device 210 and each region (for example, the first fetch region, the second fetch region, and the prefetch region) of the second memory device 220. In an embodiment, the index table may be a table that a physical address of the data and the ID of the cached memory device or the cached region are mapped to each other. In a case in which specific (target) data is to be accessed, the controller 110 may read the data by accessing the corresponding memory device or the corresponding memory region when the ID of the memory device is acquired from the index of the target data.

Accordingly, a cache hit ratio of data to be accessed may be increased by ensuring that the data evicted from the first memory device 210 to the second memory device 220 remains in the second memory device 220, before the data is evicted from the second memory device 220. Therefore, access frequency to the storage device 120 which operates at low speed may be reduced, and thus the operation speed of the data storage device 10 may be improved.

Figure 2:
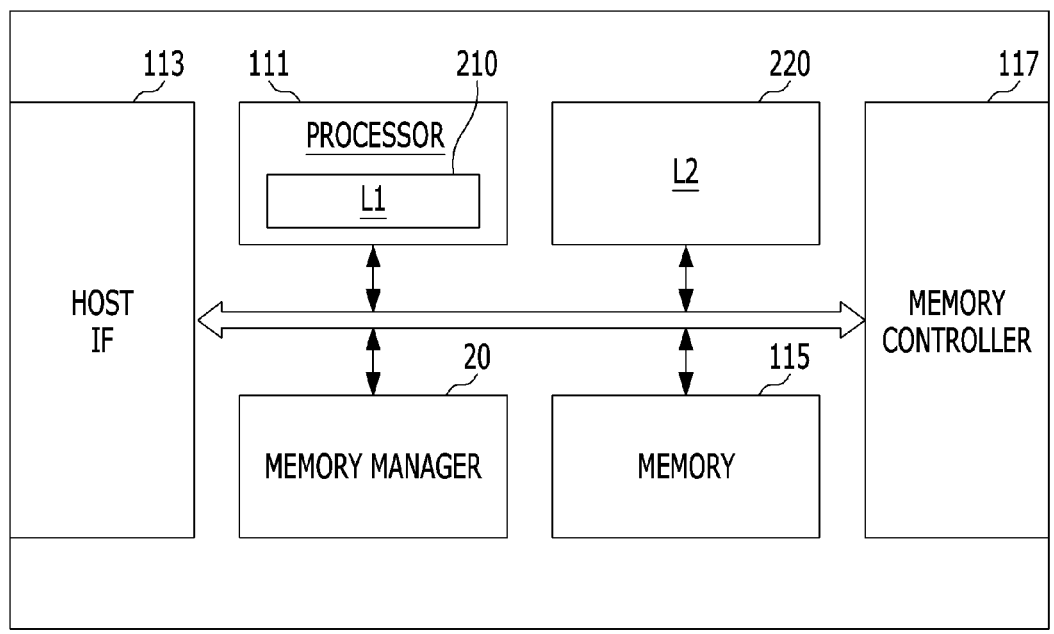
FIG. 2 is a diagram illustrating a configuration of a controller according to an embodiment of the present disclosure.

FIG. 2 is a diagram illustrating a configuration of the controller 110 according to an embodiment.

Referring to FIG. 2, the controller 110 may include a processor 111, a host interface (IF) 113, a memory 115, a memory controller 117, the second memory device 220, and the memory manager 20.

The processor 111 may include the first memory device 210 (L1) configured to store instructions and data used to perform an operation in response to a request of a host. In another embodiment, the first memory device 210 may be provided within the controller 110 but external to the processor 111.

In an embodiment, the first memory device 210 may include a memory circuit such as a static random access memory (SRAM) or a dynamic random access memory (DRAM) and control circuits configured to process accesses to the data stored in the memory circuit. The first memory device 210 may be located logically and physically closer to the processor 111 and operate at a first speed.

The host interface 113 may receive a command and a clock signal from the host according to control of the processor 111 and provide a communication channel for controlling data input/output. In particular, the host interface 113 may provide a physical connection between the host and the data storage device 10. The host interface 113 may provide interfacing between the data storage device 10 and the host according to a bus format of the host. The bus format of the host may include at least one among standard interface protocols such as a secure digital protocol, a universal serial bus (USB) protocol, a multimedia card (MMC) protocol, an embedded MMC (eMMC) protocol, a personal computer memory card international association (PCMCIA) protocol, a parallel advanced technology attachment (PATA) protocol, a serial advanced technology attachment (SATA) protocol, a small computer system interface (SCSI) protocol, a serial attached SCSI (SAS) protocol, a peripheral component interconnection (PCI) protocol, a PCI-express (PCI-e or PCIe) protocol, and a universal flash storage (UFS) protocol.

Program codes, for example, firmware or software for an operation of the controller 110 may be stored in the memory 115. The memory 115 may include a read only memory (ROM) configured to store code data and the like used by the program codes and a RAM as a main memory configured to store data for an operation of the controller 110 or data generated by the controller 110.

The memory controller 117 may provide a communication channel for signal transmission and reception between the controller 110 and the storage 120. The memory controller 117 may write input data of the host in the storage 120 according to control of the processor 111. The memory interface 119 may provide data read out from the storage 120 to the host.

The memory manager 20 may process a memory access request of the processor 111. The processor 111 may transmit the memory access request for data or instructions to the memory manager 20. In order to process the memory access request of the host, the memory manager 20 may transmit the corresponding memory access request to at least one among the first memory device 210, the second memory device 220, the memory 115, and the memory controller 117. In an embodiment, when data is not found in the first memory device 210 based on the memory access request, the memory manager 20 may find the data in the second memory device 220 or the memory 115. When the data is not found in the second memory device 220 or the memory 115, the memory manager 20 may acquire the data from the storage 120 through the memory controller 117 and transmit the acquired data to the processor 111.

The memory manager 20 may perform an operation for converting a virtual address used for processing of an application by the processor 111 into a physical address identifying a physical region (physical pages) in which the data is located.

To perform address translation of the virtual address into the physical address, the memory manager 20 may use a page table or a translation lookaside buffer (TLB) configured to store an entry selected among entries of the page table. The page table may include a plurality of entries, and each of the plurality of entries may include a virtual address, a physical page address corresponding to the virtual address, and meta information. The TLB may allow the memory request of the processor 111 to be processed at high speed by storing at least one of the entries of the page table according to a set criterion.

In an embodiment, the second memory device 220 may be divided into the fetch region and the prefetch region. In an embodiment, the memory manager 20 may be configured to load data selected from the storage 120 into the prefetch region of the second memory device 220 in advance.

The fetch region of the second memory device 220 may be divided into the first fetch region and the second fetch region, and the memory manager 20 may store the first eviction data evicted from the first memory device 210 in the first fetch region and store the second eviction data evicted from the first fetch region in the second fetch region.

Figure 3:
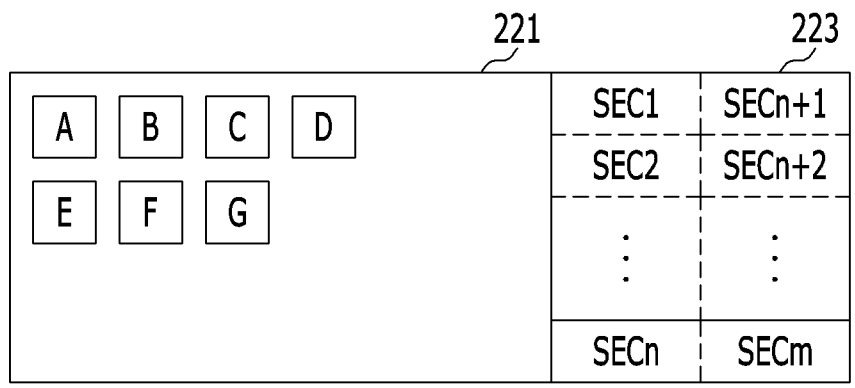
FIG. 3 is a diagram illustrating a configuration of a second memory device according to an embodiment of the present disclosure.

FIG. 3 is a diagram illustrating a configuration of a second memory device 220-1 according to an embodiment.

Referring to FIG. 3, the second memory device 220-1 may be divided into a fetch region 221 and a prefetch region 223.

First eviction data A, B, C, D, E, F, and G evicted from the first memory device 210 may be stored in the fetch region 221.

At least one piece of data randomly selected from the storage 120 according to a set criterion may be stored in the prefetch region 223. In an embodiment, the prefetch region 223 may be divided into a plurality of sections SEC1 to SECm, and data having a size corresponding to a size (or capacity) of a section may be read out from the storage 120 and then stored in the prefetch region 223. The size of the section may be set as a default unit value when the data storage device 10 is fabricated and may be adjusted by the user. The memory manager 20 may update the prefetch data based on a hit ratio for each section of the prefetch region 223.

As the data stored in the storage 120 is loaded into the prefetch region 223 in advance, access frequency to the storage 120 may be reduced, and thus the operation speed of the data storage device 10 may be improved.

Figure 4:
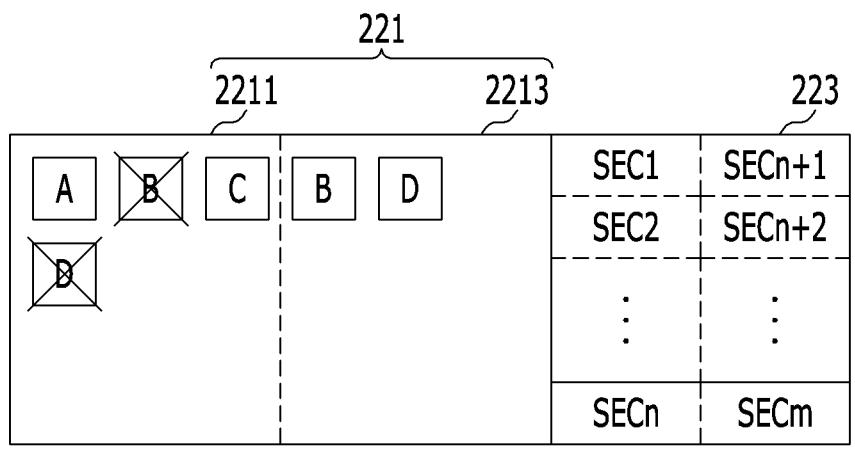
FIG. 4 is a diagram illustrating a configuration of a second memory device according to an embodiment of the present disclosure.

FIG. 4 is a diagram illustrating a configuration of a second memory device 220-2 according to an embodiment.

Referring to FIG. 4, the second memory device 220-2 may be divided into a fetch region 221 and a prefetch region 223. The fetch region 221 may be divided into a first fetch region 2211 and a second fetch region 2213.

First eviction data A, B, C, and D evicted from the first memory device 210 may be stored in the first fetch region 2211. Second eviction data B and D evicted from the first fetch region 2211 may be stored in the second fetch region 2213.

The second eviction data B and D evicted from the first fetch region 2213 may not be directly evicted from the second memory device 220-2; instead, the second eviction data B and D may remain in the second fetch region 2213. Accordingly, the access frequency to the storage 120 may be reduced.

Further, the caching positions as the data are stored in each region of the second memory device 200, 200-1, 200-2 may be managed using an index table in an application executed in the controller 110, specifically, the processor.

When a physical page address is acquired from the page table and data is found in the first memory device 210, the memory manager 20 may provide read data to the processor 111. When the data is not found in the first memory device 210, the memory manager 20 may determine whether or not data to be accessed is present in the second memory device 200 and determine in which region the data to be accessed is present in the second memory device 220, based on the index table and may read data by accessing the corresponding region. When the data is not found in the second memory device 220, the memory manager 20 may read data from a main memory region of the memory 115 or the storage 120 and transfer the read data to the processor 111.

Figure 5:
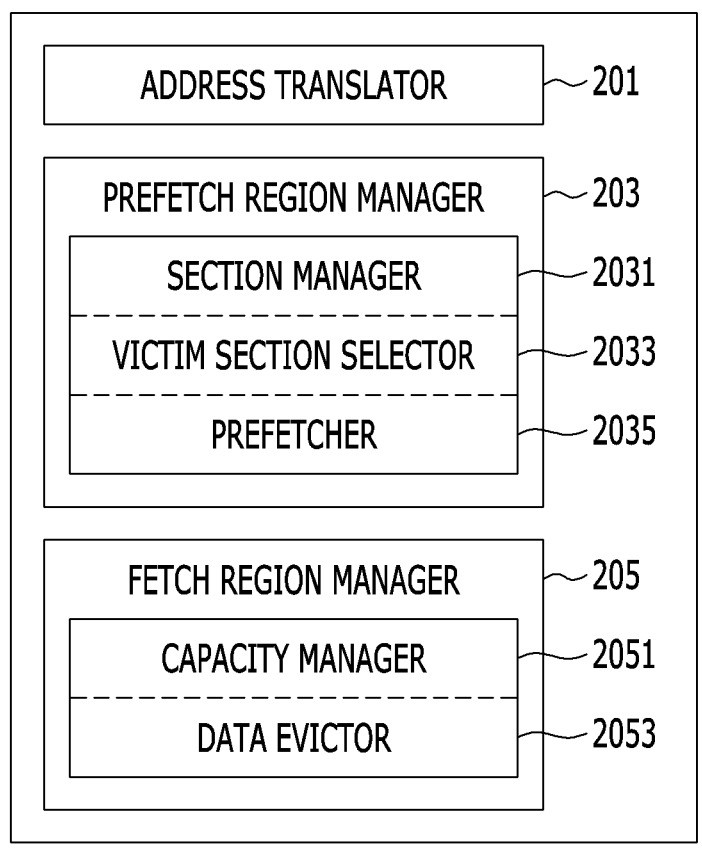
FIG. 5 is a diagram illustrating a configuration of a memory manager according to an embodiment of the present disclosure.

FIG. 5 is a diagram illustrating a configuration of the memory manager 20 according to an embodiment.

Referring to FIG. 5, the memory manager 20 may include an address translator 201, a prefetch region manager 203, and a fetch region manager 205.

The address translator 201 may perform an operation of translating a virtual address used to process an application by the processor 111 into a physical address identifying where data is located. In an embodiment, the address converter 201 may use the page table or TLB to translate the virtual address into the physical address, but the invention is not limited thereto.

As the data is cached into the first memory device 210 or the second memory device 220, the caching positon of the data may be managed using the index table in an application executed in the controller 110, specifically, the processor 111. In an embodiment, unique IDs may be allocated to the first memory device 210 and each region (for example, the first fetch region, the second fetch region, and the prefetch region) of the second memory device 220, and the physical address of the data and the ID of the cached memory device or the cached region may be mapped to each other in the index table.

The prefetch region manager 203 may be configured to select data having a size corresponding to a section size from the storage 120 according to a set criterion. Further, the prefetch region manager 203 may prefetch the selected data and to update the prefetch data based on a hit ratio for each section of the prefetch region 223.

In an embodiment, the prefetch region manager 203 may include a section manager 2031, a victim section selector 2033, and a prefetcher 2035.

The section manager 2031 may manage data prefetch/data, non-prefetch of each section in the prefetch region 223 and a hit ratio for a section in which data is prefetched. As data in the section in which the data is prefetched is accessed by the processor 111, the hit ratio of the corresponding section may be updated.

A unique ID may be allocated to the preftech region, and an application executed in the processor 111 may manage that the specific data is cached in the prefetch region using the index table. The index table may map a physical address of the data to the ID of the cached memory device or the cached region.

The victim section selector 2033 may select at least one section having a hit ratio less than a reference value VREF as the victim section based on the hit ratio for each section of the section manager 2031. Further, the victim section selector 2033 may switch or change the victim section to an empty section, and report the switching of the victim section to the section manager 2031.

When it is determined that the empty section is present through the section manager 2031, the prefetcher 2035 may read data having a size corresponding to the unit size of a section from the storage 120 according to a set criterion. Further, the prefetcher 2035 may store the read data in the empty section, and report the storage of the read data to the section manager 2031.

The fetch region manager 205 may store the first eviction data evicted from the first memory device 210 in the first fetch region 2211 according to remaining capacity of the first memory device 210. Further, the fetch region manager 205 may store the second eviction data evicted from the first fetch region 2211 in the second fetch region 2213 according to remaining capacity of the first fetch region 2211. Further, the fetch region manager 205 may be configured to evict data, which is selected from the second fetch region 2213, from the second memory device 220 according to remaining capacity of the second fetch region 2213.

In an embodiment, the fetch region manger 205 may include a capacity manager 2051 and a data evictor 2053.

The capacity manager 2051 may be configured to determine the remaining capacities of the first memory device 210, and the first fetch region 2211 and the second fetch region 2213 of the second memory device 220.

The data evictor 2053 may store victim data, for example, the first eviction data selected from the first memory device 210 in the first fetch region 2211 according to the set criterion when the remaining capacity of the first memory device 210 is less than a first threshold value TH1 as determined by the capacity manager 2051. The data evictor 2053 may store victim data, for example, the second eviction data selected from the first fetch region 2211 in the second fetch region 2213 according to the set criterion when the remaining capacity of the first fetch region 2211 is less than a second threshold value TH2 as determined by the capacity manager 2051. Further, the data evictor 2053 may be configured to evict victim data, for example, the third eviction data selected from the second fetch region 2213 according to the set criterion when the remaining capacity of the second fetch region 2213 is less than a third threshold value TH3 as determined by the capacity manager 2051.

The data evictor 2053 may use Least-Recently Used (LRU) or various other suitable policies to select the first eviction data to the third eviction data.

A unique ID may be allocated to each of the first memory device 210, the first fetch region 2211, and the second fetch region 2213. As the caching position of the data is changed to the first memory device 210, the first fetch region 2211, or the second fetch region 2213, an application executed in the processor 111 may manage where, e.g., in which region, specific data is cached in the first memory device 210 and the second memory device 220, using the index table.

Figure 6:
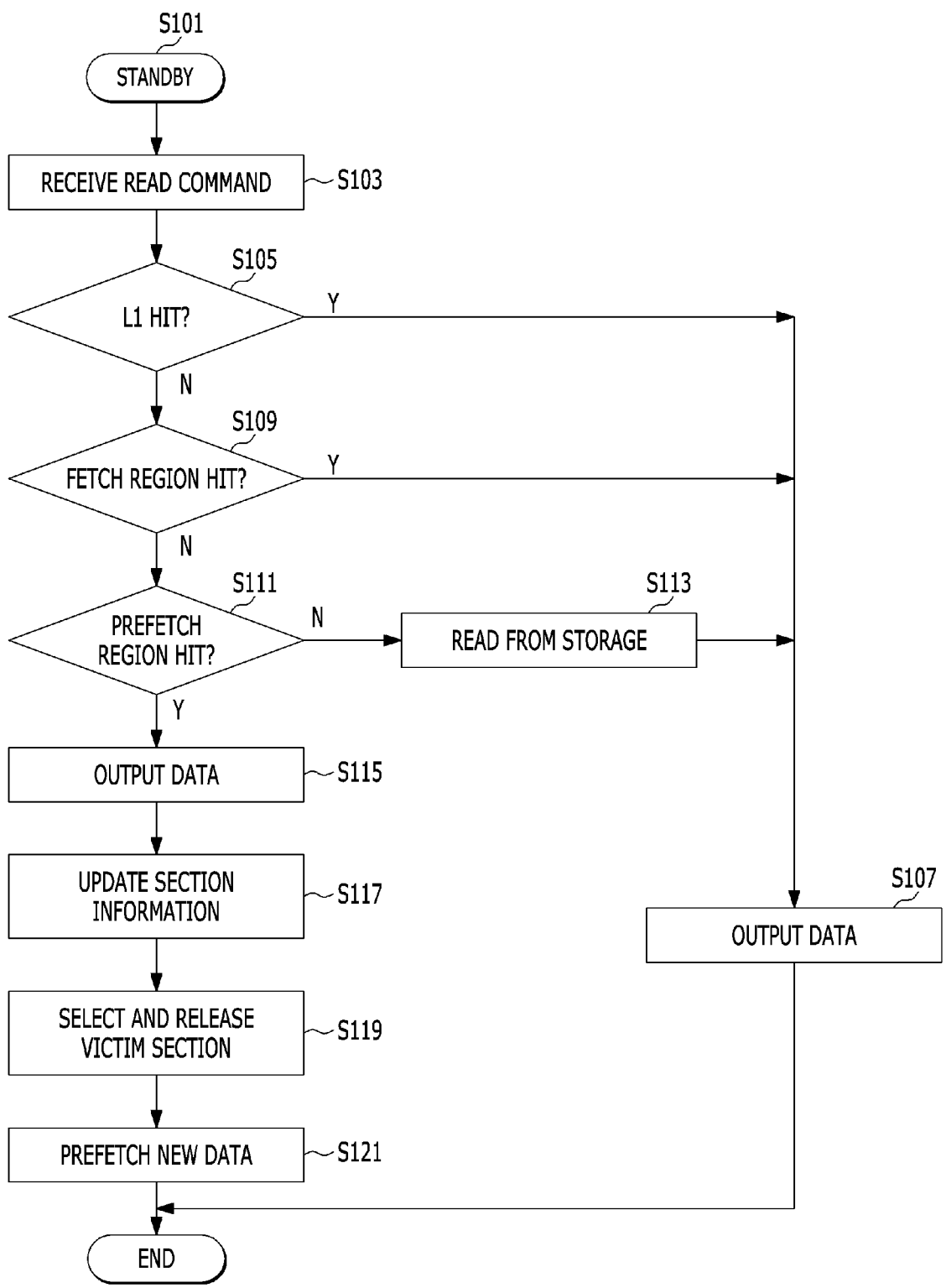
FIG. 6 is a flowchart explaining an operating method of a data storage device according to an embodiment of the present disclosure.

FIG. 6 is a flowchart explaining an operating method, for example, a read operation method of a data storage device according to an embodiment.

Referring to FIG. 6, as the processor 111 executes an application in response to a request of a host, the controller 110 in a standby state (S101) may receive a read command (S103). In response to the read command, the controller 110 may extract a physical page address corresponding to a read-requested virtual address through the address converter 201 of the memory manager 20.

The controller 110 may determine whether or not the data of the extracted physical page address is present in the first memory device (L1) 210 (S105). When it is determined that data is present in the first memory device 210 (i.e., L1 hit) (S105: Y), the controller 110 may read the data from the first memory device 210 and output the read data (S107).

When it is determined that the data of the extracted physical page address is not present in the first memory device 210 (S105: N), the controller 110 may determine whether or not the corresponding data is present in the fetch region 221 based on the index table managed by the application executed in the processor 111 (S109). When it is determined that the corresponding data is present in the fetch region 221 (i.e., fetch region hit) (S109: Y), the controller 110 may read the data from the fetch region 221 and output the read data (S107).

When it is determined that the corresponding data is not present in the fetch region 221 (S109: N), the controller 110 may determine whether or not the corresponding data is present in the prefetch region 223 based on the index table (S111).

When it is determined that the data to be read is not present in the prefetch region 223 (S111: N), the controller 110 may read data from the storage 120 (S113) and output the read data (S107).

When it is determined that the data to be read is present in the prefetch region 223 (i.e., prefetch region hit) (S111: Y), the controller 110 may read data from the prefetch region 223 and output the read data (S115).

As the data is read out from the prefetch region 223, the memory manager 20 of the controller 110 may update the hit ratio of a section in which the read data is stored (S117).

The memory manager 20 may select at least one section having a hit ratio less than the reference value REF based on the updated hit ratio for each section as a victim section and switch or change the selected victim section as an empty section (S119). The memory manager 20 of the controller 110 may select and read data having a size corresponding to the unit size of the section from the storage 120 according to a set criterion and prefetch the read data in the empty section (S121).

Figure 7:
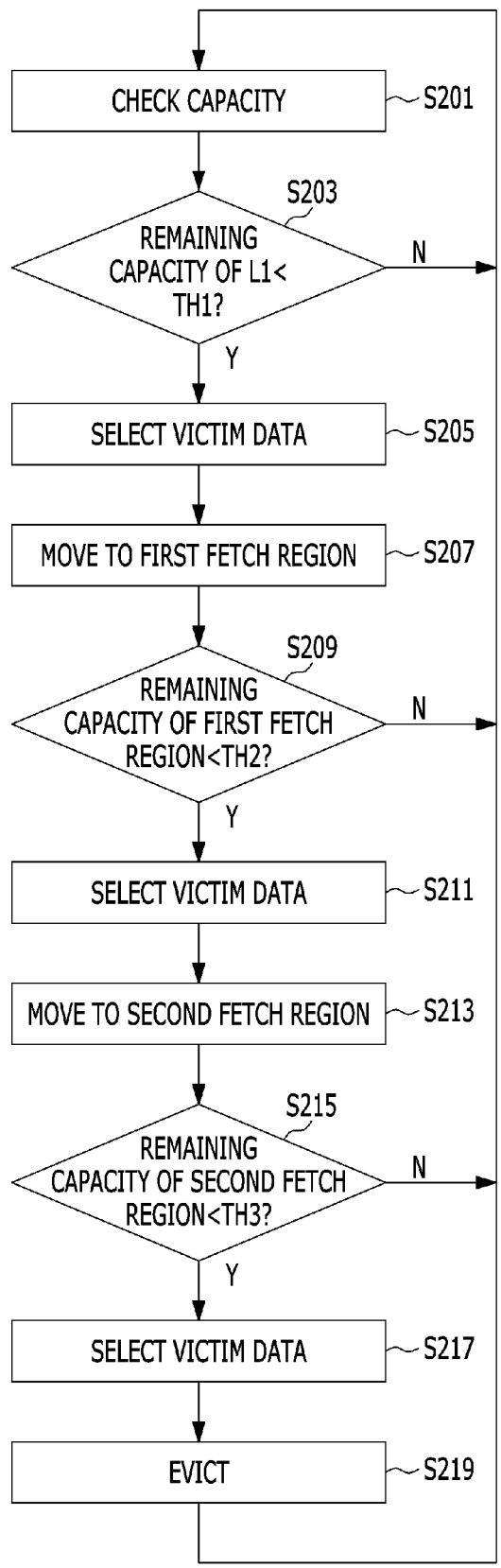
FIG. 7 is a flowchart explaining an operating method of a data storage device according to an embodiment of the present disclosure.

FIG. 7 is a flowchart explaining an operating method of a data storage device, for example, a method of managing the first memory device 210 and the second memory device 220 according to an embodiment.

Referring to FIG. 7, according to a set frequency or a capacity management event generated for the first and second memory devices 210 and 220, the controller 110 may determine or check remaining capacity of the first memory device 210 (S201).

When the remaining capacity of the first memory device 210 (i.e., L1) is less than the first threshold value TH1 (S203: Y), the controller 110 may select victim data, for example, first eviction data from the first memory device 210 according to a set criterion or a suitable policies (S205) and store the selected first eviction data in the first fetch region 2211 (S207).

When the remaining capacity of the first fetch region 2211 is less than the second threshold value TH2 (S209: Y), the controller 110 may select victim data, for example, second eviction data from the first fetch region 2211 according to a set criterion (S211) and store the selected second eviction data in the second fetch region 2213 (S213).

When the remaining capacity of the second fetch region 2213 is less than the third threshold value TH3 (S215: Y), the controller 110 may select victim data, for example, third eviction data from the second fetch region 2213 according to a set criterion (S217) and evict the selected third eviction data (S219).

The controller 110 may use Least-Recently Used (LRU) or various other suitable policies to select the first eviction data to the third eviction data.

A unique ID may be allocated to each of the first memory device 210, the first fetch region 2211, and the second fetch region 2213. As the caching position of the data is changed to the first memory device 210, the first fetch region 2211, or the second fetch region 2213, an application executed in the processor 111 may manage where, in which region, specific data is cached in the first memory device 210 and the second memory device 220, using the index table.

When the remaining capacity of the first memory device 210 (i.e., L1) is greater than or equal to the first threshold value TH1 (S203: N), when the remaining capacity of the first fetch region 2211 is greater than or equal to the second threshold value TH2 (S209: N), or when the remaining capacity of the second fetch region 2213 is greater than or equal to the third threshold value TH3 (S215: N), the controller 110 may terminate the management operation and return to operation S201 of determining the capacity.

Figure 8:
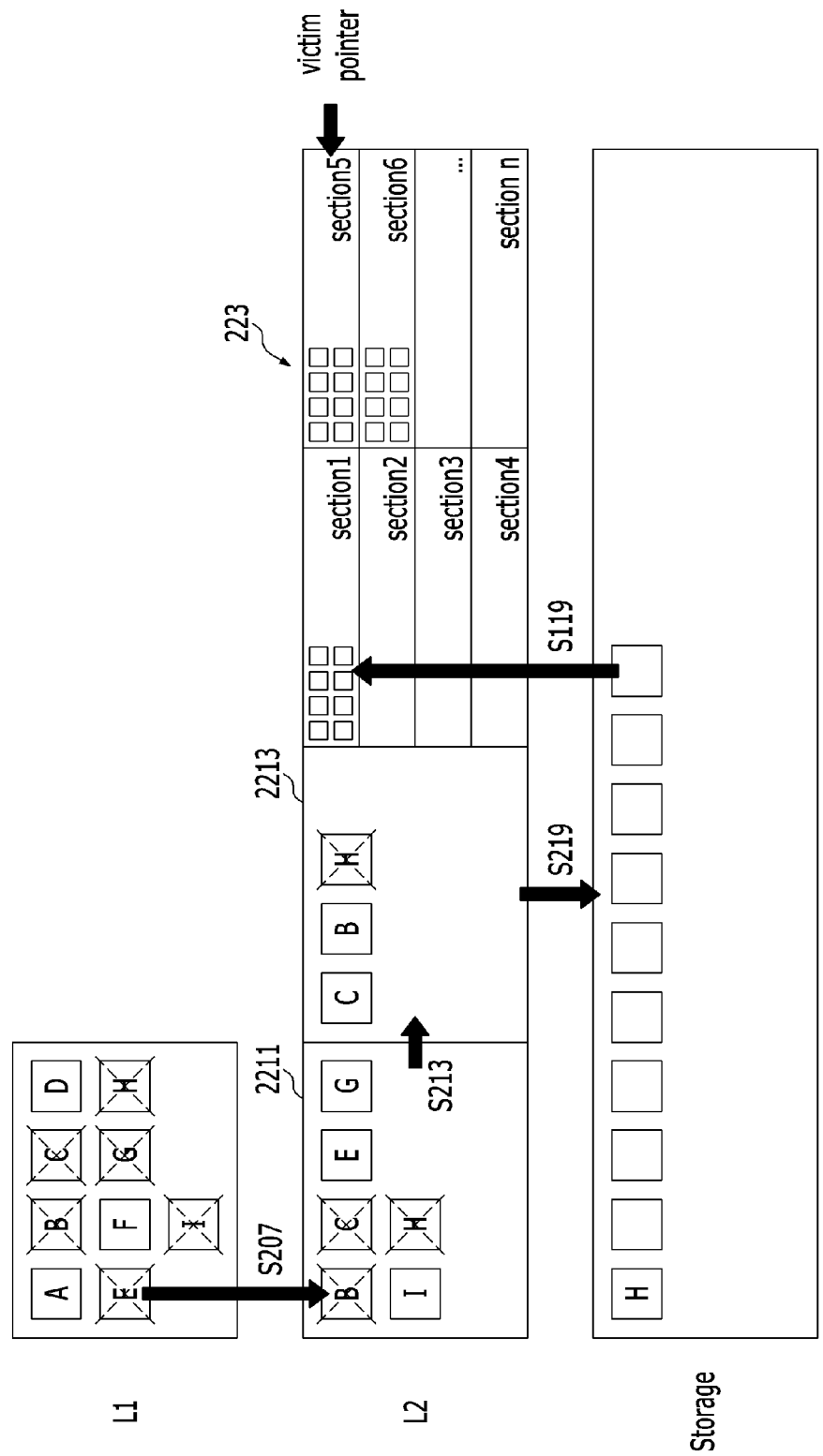
FIG. 8 is a conceptual diagram explaining an operating method of a data storage device according to an embodiment of the present disclosure.

FIG. 8 is a conceptual diagram explaining an operating method of a data storage device according to an embodiment.

Referring to FIG. 8, when data A, B, C, D, E, F, G, H, and I are stored in the first memory device (i.e., L1) 210 and the remaining capacity of the first memory device 210 is less than the first threshold value TH1, the controller 110 may select the data B, C, E, G, I and H from the first memory device (L1) 210 as the first eviction data and evict the first eviction data B, C, E, G, I and H from the first memory device 210 and transfer such data to the first fetch region 2211. Thus, the capacity of the first memory device 210 may be secured to have at least a threshold capacity (see operation S207 of FIG. 7).

When the remaining capacity of the first fetch region 2211 is less than the second threshold value TH2 as the data are continuously cached in the first fetch region 2211, the controller 110 may select the data B, C, and H as second eviction data from the first fetch region 2211 and evict the second eviction data from the first fetch region 2211 to the second fetch region 2213. Thus, the capacity of the first fetch region 2211 may be secured to have at least a threshold capacity (see operation S213 of FIG. 7).

When the remaining capacity of the second fetch region 2213 is less than the third threshold value TH3 as the data are continuously cached in the second fetch region 2213, the controller 110 may select the data H as the third eviction data from the second fetch region 2213 and evict the third eviction data from the second fetch region 2213 to the storage 120. Thus, the capacity of the second fetch region 2213 may be secured to have at least a threshold capacity (see operation S219 of FIG. 7).

The controller 110 may select data having a size corresponding to a section size from the storage 120 and load the selected data into the prefetch region 223 in advance (see operation S119 of FIG. 6).

According to the present technology, data may be loaded (prefetched) in advance before the data stored in the storage is accessed and thus the data hit ratio at the cache region may be increased.

Further, the victim data is maintained at the cache region once again before the victim data is evicted to the storage and thus data input/output speed may be improved.

Figure 9:
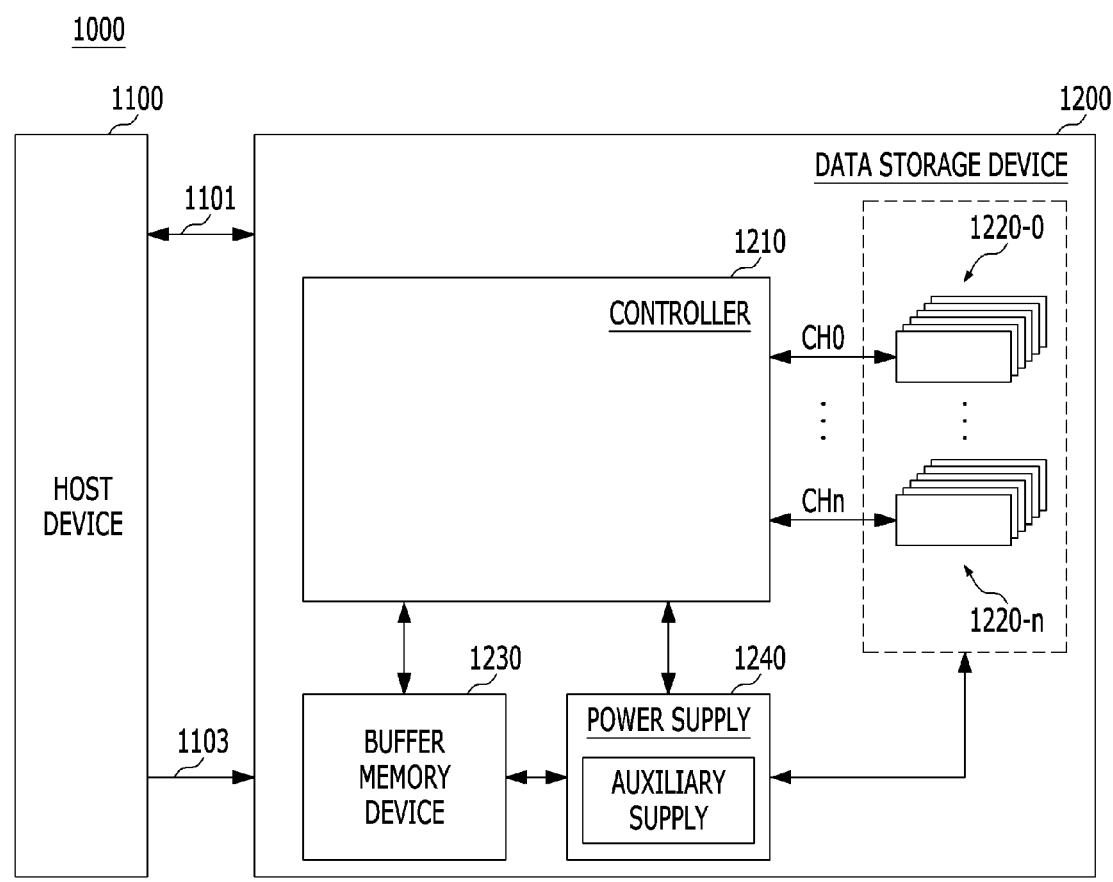
FIG. 9 is a diagram illustrating a data storage system in accordance with an embodiment.

FIG. 9 is a diagram illustrating a data storage system 1000 in accordance with an embodiment.

Referring to FIG. 9, the data storage 1000 may include a host device 1100 and the data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface circuit, a control circuit, a random access memory used as a working memory, an error check and correction (ECC) circuit, and a memory interface circuit. In an embodiment, the controller 1210 may configured as controller 110 shown in FIGS. 1 and 2.

The host device 1100 may exchange a signal with the data storage device 1200 through the signal connector 1101. The signal may include a command, an address, data, and the like.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH0 to CHn, respectively. One or more nonvolatile memory devices may be coupled to the same channel. The nonvolatile memory devices coupled to the same channel may be coupled to the same signal bus and data bus.

The power supply 1240 may provide power inputted through the power connector 1103 to the controller 1210, the nonvolatile memory devices 1220-0 to 1220-n and the buffer memory device 1230 of the data storage device 1200. The power supply 1240 may include an auxiliary power supply. The auxiliary power supply may supply power to allow the data storage device 1200 to be properly terminated when a sudden power interruption occurs. The auxiliary power supply may include bulk-capacity capacitors sufficient to store the needed charge.

The signal connector 1101 may be configured as one or more of various types of connectors depending on an interface scheme between the host device 1100 and the data storage device 1200.

The power connector 1103 may be configured as one or more of various types of connectors depending on a power supply scheme of the host device 1100.

Figure 10:
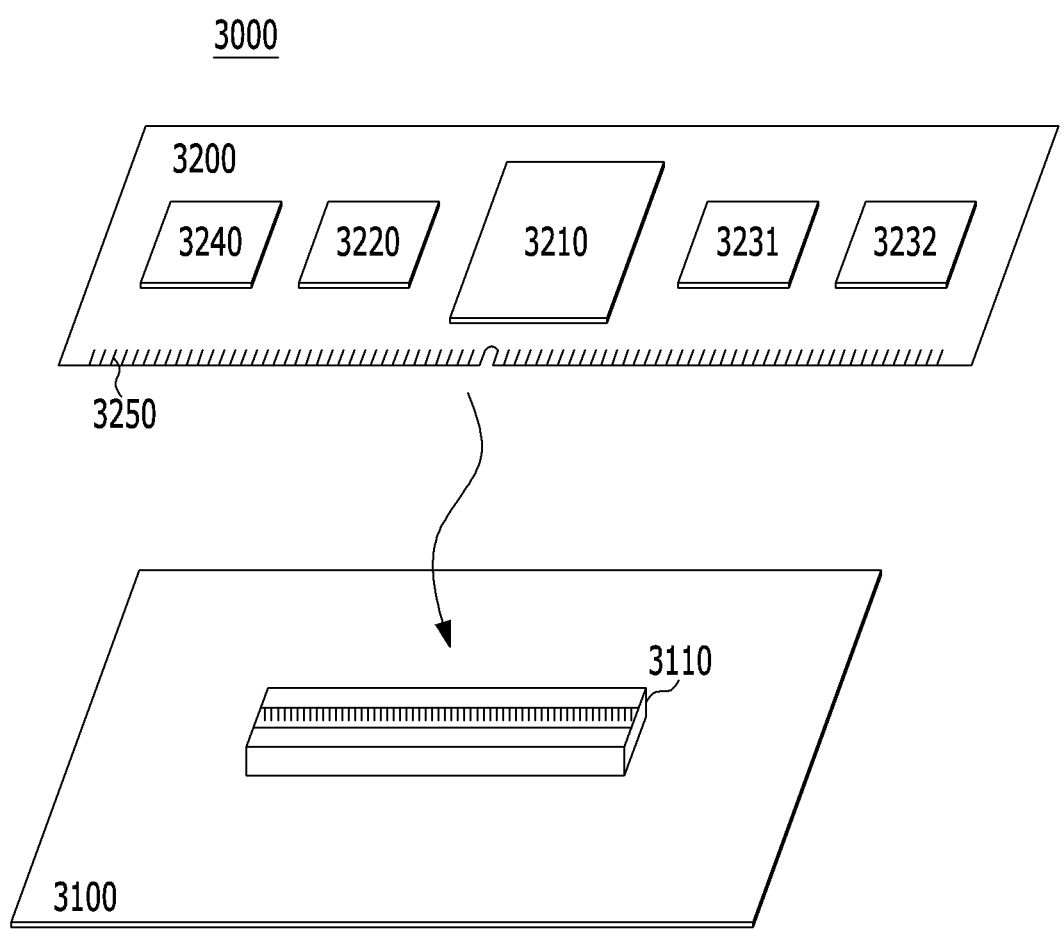
FIG. 10 and FIG. 11 are diagrams illustrating a data processing system in accordance with an embodiment.

FIG. 10 is a diagram illustrating a data processing system 3000 in accordance with an embodiment. Referring to FIG. 10, the data processing system 3000 may include a host device 3100 and a memory system 3200.

The host device 3100 may be configured in the form of a board, such as a printed circuit board. Although not shown, the host device 3100 may include internal function blocks for performing the function of a host device.

The host device 3100 may include a connection terminal 3110, such as a socket, a slot, or a connector. The memory system 3200 may be mated to the connection terminal 3110.

The memory system 3200 may be configured in the form of a board, such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be configured in the same manner as the controller 110 shown in FIGS. 1 and 2.

The buffer memory device 3220 may temporarily store data to be stored in the nonvolatile memory devices 3231 and 3232. Further, the buffer memory device 3220 may temporarily store data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250 to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data, and the like, and power may be transferred between the host device 3100 and the memory system 3200. The connection terminal 3250 may be configured as one or more of various types depending on an interface scheme between the host device 3100 and the memory system 3200. The connection terminal 3250 may be disposed on a side of the memory system 3200, as shown.

Figure 11:
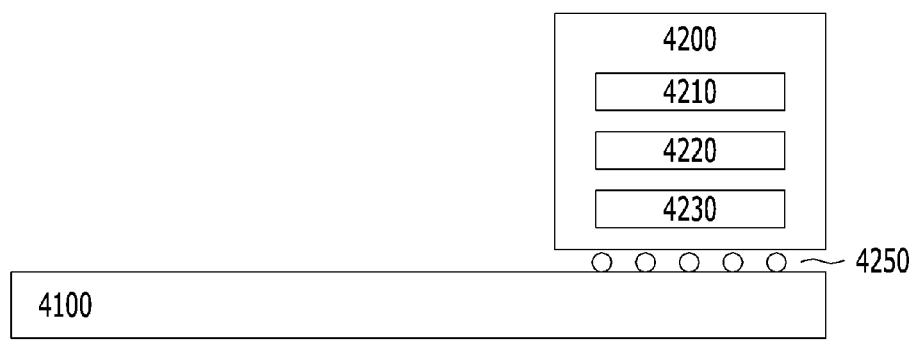

FIG. 11 is a diagram illustrating a data processing system 4000 in accordance with an embodiment. Referring to FIG. 11, the data processing system 4000 may include a host device 4100 and a memory system 4200.

The host device 4100 may be configured in the form of a board, such as a printed circuit board. Although not shown, the host device 4100 may include internal function blocks for performing the function of a host device.

The memory system 4200 may be configured in the form of a surface-mounted type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 shown in FIGS. 1 and 2.

The buffer memory device 4220 may temporarily store data to be stored in the nonvolatile memory device 4230. Further, the buffer memory device 4220 may temporarily store data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 12:
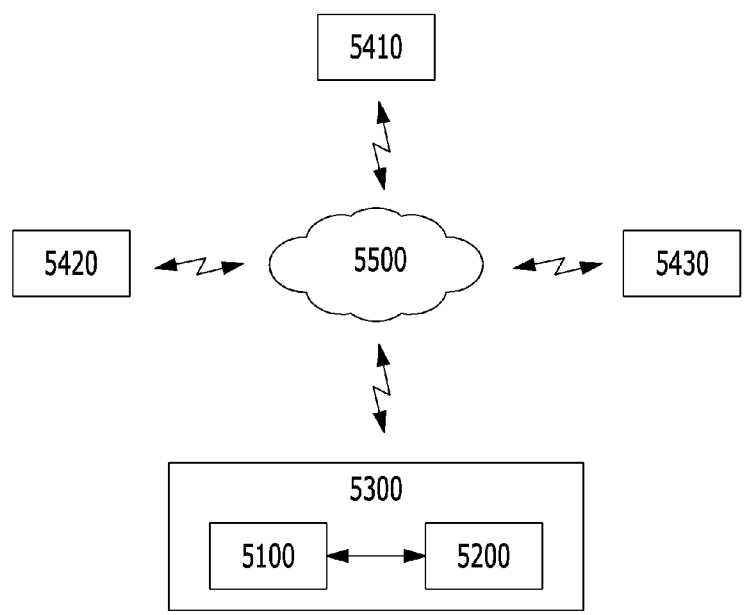
FIG. 12 is a diagram illustrating a network system including a data storage device in accordance with an embodiment.

FIG. 12 is a diagram illustrating a network system 5000 including a data storage device, in accordance with an embodiment. Referring to FIG. 12, the network system 5000 may include a server system 5300 and a plurality of client systems 5410, 5420, and 5430, which are coupled through a network 5500.

The server system 5300 may service data in response to requests from the plurality of client systems 5410 to 5430. For example, the server system 5300 may store the data provided by the plurality of client systems 5410 to 5430. For another example, the server system 5300 may provide data to the plurality of client systems 5410 to 5430.

The server system 5300 may include a host device 5100 and a memory system 5200. The memory system 5200 may be configured as the memory system 10 shown in FIG. 1, the data storage device 1200 shown in FIG. 9, the memory system 3200 shown in FIG. 10, or the memory system 4200 shown in FIG. 11.

The above described embodiments of the present invention are intended to illustrate, not to limit the present invention. Various alternatives and equivalents are possible. The invention is not limited by the embodiments described herein. Nor is the invention limited to any specific type of semiconductor device. Other additions, subtractions, or modifications will be apparent to those skilled in the art in view of the present disclosure and are intended to fall within the scope of the appended claims.

What is claimed is:

1. A data storage device comprising:
a first memory device;
a second memory device including a fetch region configured to store data evicted from the first memory device;
storage; and
a controller configured to control the first memory device, the second memory device, and the storage,
wherein the fetch region includes a first fetch region and a second fetch region, and
wherein the controller includes a memory manager configured to store first eviction data evicted from the first memory device in the first fetch region, store second eviction data evicted from the first fetch region in the second fetch region, and evict third eviction data from the second memory device.

2. The data storage device of claim 1, wherein the first memory device operates at a first speed, the second memory device operates at a second speed slower than the first speed, and the storage operates at a third speed slower than the first speed.

3. The data storage device of claim 1,
wherein the second memory device further include a prefetch region divided into a plurality of sections,
wherein the memory manager is configured to select prefetch data having a set section size from the storage, load the selected prefetch data into the prefetch region and update the prefetch data based on a data read hit ratio of each of the plurality of sections, and
wherein the memory manager comprises:
a victim section selector configured to select at least one section of which the data read hit ratio is less than a reference value as a victim section and change the victim section to an empty section; and
a prefetcher configured to select the prefetch data from the storage and load the selected prefetch data into the empty section when it is determined that the empty section is present.

4. The data storage device of claim 3, wherein the prefetch data is randomly selected.

5. The data storage device of claim 3, wherein the controller is configured to access the first memory device, the fetch region and the prefetch region, and the storage in order of the first memory device, the fetch region and the prefetch region, and the storage until read-requested data is found in response to a read request of a host.

6. The data storage device of claim 1, wherein the third eviction data is selected from the second fetch region.

7. The data storage device of claim 6, wherein the memory manager is configured to select the first eviction data from the first memory device and evict the selected first eviction data from the first memory device and transfer the selected first eviction data to the first fetch region when remaining capacity of the first memory device is less than a first threshold value, to select the second eviction data from the first fetch region and evict the selected second eviction data from the first fetch region and transfer the selected second eviction data to the second fetch region when remaining capacity of the first fetch region is less than a second threshold value, and to select the third eviction data from the second fetch region and evict the selected third eviction data from the second memory device when remaining capacity of the second fetch region is less than a third threshold value.

8. An operating method of a data storage device which includes a first memory device, a second memory device which includes a fetch region configured to store data evicted from the first memory device, storage, and a controller, the method comprising:
storing, by the controller, first eviction data evicted from the first memory device in a first fetch region, storing, by the controller, second eviction data evicted from the first fetch region in a second fetch region, and evicting third eviction data from the second memory device,
wherein the fetch region includes the first fetch region and the second fetch region.

9. The method of claim 8, wherein the first memory device operates at a first speed, the second memory device operates at a second speed slower than the first speed, and the storage operates at a third speed slower than the first speed.

10. The method of claim 8, wherein the second memory device further include a prefetch region divided into a plurality of sections, and wherein the method further comprising:
  selecting, by the controller, prefetch data having a size corresponding to a section size from the storage and loading the selected prefetch data into the prefetch region; and
  updating, by the controller, the prefetch data based on a data read hit ratio of each of the plurality of sections.

11. The method of claim 10, wherein the prefetch data is randomly selected.

12. The method of claim 10, further comprising accessing, by the controller, the first memory device, the fetch region and the prefetch region, and the storage in order of the first memory device, the fetch region and the prefetch region, and the storage until read-requested data is found in response to a read request of a host.

13. The method of claim 8, wherein:
  the third eviction data is selected from the second fetch region.

14. The method of claim 13, wherein:
  the storing in the first fetch region includes selecting the first eviction data from the first memory device and evicting the selected first eviction data from the first memory device and transfer the selected first eviction data to the first fetch region when remaining capacity of the first memory device is less than a first threshold value,
  the storing in the second fetch region includes selecting the second eviction data from the first fetch region and evicting the selected second eviction data from the first fetch region and transfer the selected second eviction data to the second fetch region when remaining capacity of the first fetch region is less than a second threshold value, and
  the evicting from the second memory device includes selecting the third eviction data from the second fetch region and evicting the selected third eviction data from the second memory device when remaining capacity of the second fetch region is less than a third threshold value.

15. A data storage device comprising:
  a storage; and
  a controller including first and second memories and configured to control the first memory, the second memory, and the storage, the second memory including a first region, a second region and a third region including a plurality of sections,
  wherein the controller is configured to:
  store data evicted from the first memory in the first region;
  store data evicted from the first region in the second region; and
  select prefetch data having a set section size from the storage, and load the prefetch data into a particular section of the third region, the particular section determined based on a data read hit ratio.

* * * * *